US011531358B2

(12) United States Patent
White

(10) Patent No.: US 11,531,358 B2
(45) Date of Patent: Dec. 20, 2022

(54) METHOD AND APPARATUS FOR GENERATING AN AERIAL NAVIGATION ROUTE BASED ON A PAYLOAD SURVIVABILITY ESTIMATE

(71) Applicant: HERE GLOBAL B.V., Eindhoven (NL)

(72) Inventor: Donta White, Racine, WI (US)

(73) Assignee: HERE Global B.V., Eindhoven (NL)

( * ) Notice: Subject to any disclaimer, the term of this patent is extended or adjusted under 35 U.S.C. 154(b) by 287 days.

(21) Appl. No.: 16/851,933

(22) Filed: Apr. 17, 2020

(65) Prior Publication Data
US 2021/0325907 A1 Oct. 21, 2021

(51) Int. Cl.
*G05D 1/10* (2006.01)
*B64C 39/02* (2006.01)

(52) U.S. Cl.
CPC .......... *G05D 1/106* (2019.05); *B64C 39/024* (2013.01); *B64C 2201/027* (2013.01); *B64C 2201/128* (2013.01); *B64C 2201/141* (2013.01); *G05D 1/101* (2013.01)

(58) Field of Classification Search
CPC ...... G05D 1/106; G05D 1/101; B64C 39/024; B64C 2201/027; B64C 2201/128; B64C 2201/141
See application file for complete search history.

(56) References Cited

U.S. PATENT DOCUMENTS

| | | | |
|---|---|---|---|
| 9,494,937 B2 | 11/2016 | Siegel et al. | |
| 9,959,773 B2 | 5/2018 | Raptopoulos et al. | |
| 2013/0297271 A1* | 11/2013 | Herman | G06Q 10/10 703/8 |
| 2017/0061802 A1* | 3/2017 | Barraci | G08G 5/006 |
| 2017/0129603 A1 | 5/2017 | Raptopoulos et al. | |
| 2017/0286892 A1 | 10/2017 | Studnicka | |
| 2018/0061249 A1* | 3/2018 | Cui | G08G 5/0043 |
| 2018/0068567 A1* | 3/2018 | Gong | H04W 4/022 |
| 2018/0227040 A1* | 8/2018 | Hudson | B64C 39/024 |
| 2018/0299892 A1 | 10/2018 | Brooks et al. | |
| 2019/0101934 A1 | 4/2019 | Tuukkanen et al. | |
| 2020/0092052 A1* | 3/2020 | MacAfee | H04L 1/08 |
| 2021/0280072 A1* | 9/2021 | Ortlieb | G08G 5/045 |

* cited by examiner

*Primary Examiner* — Hunter B Lonsberry
*Assistant Examiner* — Jay Khandpur
(74) *Attorney, Agent, or Firm* — Jeffrey R. Moisan; HERE Global B.V.

(57) ABSTRACT

An approach is provided for calculating a payload survivability estimate and generating aerial routes based on the payload survivability estimate. The approach, for example, involves processing data, such as map data representing the geographic area to identify at least one map feature, at least one material corresponding with the at least one map feature, or a combination thereof. The payload survivability estimate can be based on real-time data, historical data, or a combination thereof. The approach also involves generating a map data layer of a geographic database based on the payload survivability estimate. The approach further involves providing the map data layer as an output.

20 Claims, 9 Drawing Sheets

METHOD AND APPARATUS FOR GENERATING AN AERIAL NAVIGATION ROUTE BASED ON A PAYLOAD SURVIVABILITY ESTIMATE

BACKGROUND

During transit of a payload to its destination, an unmanned aerial drone may encounter an event causing the aerial drone to lose control of the payload resulting in the payload no longer functioning following an impact with the ground. For example, the aerial drone could lose control of a package over various types of environments. In another example, the unmanned aerial drone could lose control of a payload at a very high altitude permitting the payload to descend at a high rate of speed. A payload that has obtained these speeds will likely be destroyed upon impact or cause injury/death to someone hit by the payload on the ground. As the delivery of payloads or packages begins to become common place and a part of our everyday lives, the confidence level of using drones to deliver the payload will also increase as well as the likelihood of an aerial drone losing its package. As a result, drone operators face significant technical challenges to minimize the damage to payloads and the damage caused by a payload upon impact.

SOME EXAMPLE EMBODIMENTS

Therefore, there is a need for an approach for generating the best route for an aerial drone with the least probability that the package will be destroyed on impact should an event occur causing the drone to lose control of the package. If the probability of the package surviving is increased by taking the best route, then it is likely that the payload would still be useable if/when they are recovered.

According to one embodiment, a method for generating an aerial navigation route based on a payload survivability estimate comprises determining a payload of an aerial drone configured to operate over a geographic area. The payload can be but is not limited to a package or cargo that the aerial drone is delivering to a destination. The method further comprises processing map data representing the geographic area to identify at least one map feature (e.g. street, river, building, farm), at least one material (e.g. water, rock, wood, metal, brick, cement) corresponding with the at least one map feature. In one embodiment, a payload survivability estimate is calculated to determine the probability the payload will be functional following an impact. In another embodiment, the payload survivability estimate is based on sensor data collected from a sensor of the aerial drone. In another embodiment, the payload survivability estimate is based on real-time data, historical data, or a combination thereof. The method also comprises generating an aerial navigation route based on the payload survivability estimate.

According to another embodiment, an apparatus for generating an aerial navigation route based on a payload survivability estimate comprises at least one processor, and at least one memory including computer program code for at least one computer program, the at least one memory and the computer program code configured to, with the at least one processor, cause, at least in part, the apparatus to receive map data representing a geographic area to identify at least one map feature, at least one material comprising the at least one map feature, or a combination thereof. The apparatus is also caused to calculate a payload survivability estimate for a payload based on the at least one map feature, the at least one material, or a combination thereof. In one embodiment, the payload survivability estimate is based on real-time data, historical data, or a combination thereof. In another embodiment, the payload survivability estimate is based on sensor data collected from a sensor of the aerial drone. The apparatus is also caused to provide data for generating the aerial navigation route for an aerial drone based on the payload survivability estimate.

According to another embodiment, a non-transitory computer-readable storage medium carries one or more sequences of one or more instructions which, when executed by one or more processors, cause, at least in part, an apparatus to determine a payload survivability estimate for a payload based on at least one map feature, at least one material, or a combination thereof in a geographic area. In one embodiment, the payload survivability estimate is based on real-time data, historical data, or a combination thereof. In another embodiment, the payload survivability estimate is based on sensor data collected from a sensor of the aerial drone. The apparatus is also caused to generate a map data layer based on the payload survivability estimate. The apparatus is further caused to provide the map data layer as an output, wherein the output is published in a geographic database.

According to another embodiment, an apparatus is caused to further create a data model representing the payload survivability over a geographic area, wherein the map data layer further includes the data model. In another embodiment, the apparatus is caused to further determine a route based on the data model representing the payload survivability over a geographic area in combination with terrain data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for generating an aerial navigation route based on a payload survivability estimate are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
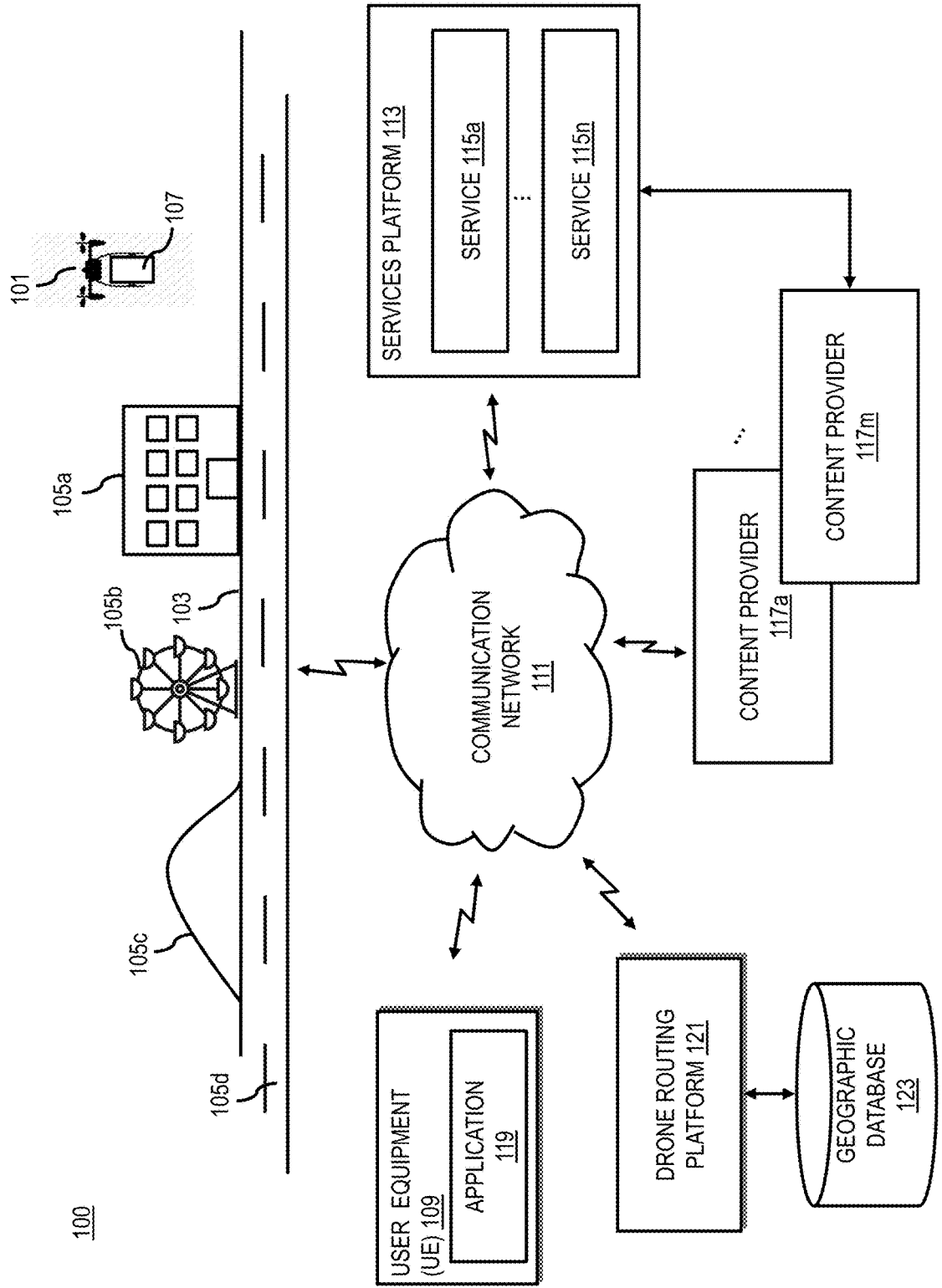
FIG. 1 is a diagram of a system capable of mapping a payload survivability estimate over a geographic area and generating aerial routes, according to one embodiment.

FIG. 1 is a diagram of a system 100 capable of generating aerial navigation routes based on a payload survivability estimate, according to one embodiment. The use of unmanned aerial vehicles (UAV) is becoming more widespread particularly for commercial services such as package delivery. Commercial uses generally requirement high target of levels of successful trips (e.g., successfully reaching a delivery location or other destination with cargo intact). However, as drone delivery services become more common, the likelihood of a drone 101 losing its payload 107 increases. The probability of the payload 107 functioning following the fall is dependent on the map features 105 on the ground, as well as the material the map features 105 are comprised of, or correspond with, that the UAV encounters along the delivery routes. As used herein, the term map features 105 refers to any manmade or natural object that is capable of causing a measure of damage to a payload 107 upon impact. As used herein, the term payload refers to cargo, package, or object that is detachable or intended to be attached to the drone 101 when executing an aerial route. A UAV or unmanned aerial system (UAS) or aerial vehicle is commonly known as a drone 101. Therefore, service providers face significant technical challenges to optimize drone routing to increase the probability a payload 107 is still functioning should an event occur that causes the drone 101 to lose control of the payload 107. A service provider may also want to optimize the drone routing to increase the probability a payload 107 is not functional after a fall, if the payload 107 has a confidential or secret quality or is likely to cause harm to someone (e.g. a child finding prescription medication that fell from a drone 101).

Generally, a drone 101 operates by flying above the ground 103, buildings 105a, playgrounds 105b, hills/mountains 105c, roads 105d, etc. (also collectively referred to as map features 105), and/or other public spaces where safety risks to the public and/or the aerial vehicle 101 as well as other flight restrictions often apply. In one embodiment, the map features 105 can also be natural object or geographic terrain such as but not limited to farms, forests, rivers, lakes, hills/mountains 105c. In another embodiment, the map features 105 includes manmade or civilization terrain that includes manmade structures such as but not limited to parks/ playgrounds 105b, commercial and non-commercial buildings105a, highways/roads 105d, and bridges.

By way of example, a drone 101 may experience a malfunction or loss of control of a payload 107 during the course of a delivery route over various types of natural or manmade map features 105. Each of these map features 105 are made of various materials that can increase or decrease the probability a payload 107 is operable should a payload 107 fall from a drone 101 and come into contact or impact the map feature 105. For example, the probability a payload 107 is operable after impact with the side of a concrete building is low and would likely render the payload 107 unusable if recovered. However, if the drone 101 was flying a delivery route over a map feature 105, such as a farm, where the probability that the payload 107 is operable after impact is higher, then it is more likely the payload 107 will be usable if recovered. A map feature 105 could be comprised of, or correspond with, other materials such as but not limited to wood, asphalt, dirt, rock minerals aluminum/wood siding, or brick wherein each material has a respective probability a payload 107 would be functional after an impact with the material.

In addition, any malfunctioning or loss of control of the payload 107 by the drone 101 can pose a serious threat to pedestrians or crowds on the ground 103. Other issues occurring in specific areas of the flight path or potential flight path of the drone 101, such as events (e.g., protests, festivals, etc.) where the probability of a payload 107 impacting an individual can also increase potential risks associated with operating the drone 101. For example, flying over areas with high densities of pedestrians can increase the probability that the payload 107 may cause serious injury or death.

While pilots (e.g., human or machine) of drones 101 can typically distinguish between a farm or an urban area, but it can be much more technically challenging for pilots to determine or perceive the risks when flying a route over areas where the material comprising the multiple types of map features 105 is constantly changing. As mentioned above, it may be preferable to fly a route over map features 105 that would increase the probability that a payload 107 is destroyed upon impact with a map feature 105.

To address the technical challenges, the system 100 of FIG. 1 introduces a capability to calculate a payload survivability estimate over a geographic area, and then use the payload survivability estimate to create a route over the geographic that is optimized based on the map features 105 and the materials the map features 105 are comprised of (e.g., by using a routing cost function that minimizes the payload survivability estimate). In one embodiment, the system 100 can also configure a drone 101 to react in real-time and/or to re-route based on the mapped historical and real-time data and intelligence on payload survivability estimates. In this way, the system 100 can combine optimized drone routes with real-time edge decision making at critical decision points to ensure the success of a drone route (e.g., success of a package delivery mission). In one embodiment, when the system 100 creates a route or updates a route based on real-time data, the system 100 may modify flight parameters such as but not limited to the drone's 101 airspeed or flight altitude.

Although the various embodiments described herein are discussed with respect to drones or aerial vehicles 101 operating in the airspace above the ground, it is contemplated that the embodiments are applicable to any type of vehicle (manned or unmanned) operating at any altitude within the airspace of the Earth.

In one embodiment, to map the payload survivability estimate, the system 100 can factor the historical and real-time probe data (e.g., from other aerial vehicles or drones 101), sensor data, and/or other available data on map features 105 in a given geographic area. For example, one type of map feature 105 is a building or a crowd. In this example, the system 100 can query data indicating a special event with large crowds is scheduled in a given area or geometry. In one embodiment, the system 100 can combine the queried data with other data such as but not limited to sensor data from another drone indicating a high concentration of concrete buildings, weather reports, and land usage over a period of time (e.g., farms with vegetation or no vegetation), etc. to generate map data indicating the historical and/or real-time densities of probabilities of payload survivability in a given geographic area for storage in a geographic database 123.

The map data in the geographic database 123 can then be used to calculate a payload survivability estimate over a geographic area, or to generate drone routes that avoids or minimizes potential exposure to map features 105 likely to render a payload 107 inoperable upon impact. In this way, the system 100 advantageously enables drone operators to navigate their drones 101 with reduced risks or with a greater understanding of the risks arising from encountering map features 105 likely to render a payload 107 inoperable on a route.

In one embodiment, the data used by the system 100 to map the payload survivability estimate over a geographic area and/or route/re-route/react/etc. to avoid certain map features 105 include but is not limited to:

Available real-time flight data (e.g., altitude of the drone 101);
Available real-time sensor data (e.g. LiDAR);
Available real-time and historical data of land usage (e.g. status of vegetation growth of farms or the construction of buildings) within or along a route a drone 101 may take (e.g., to deliver a package);
Available real-time data of other drones in the area;
Available real-time and historical data on weather in a certain area;
Available real-time and historical data of map features 105 (e.g., buildings, streets/highways, forests, rivers, etc.) in a given area; and
Available real-time and historical data on events that may involve a population or crowds (e.g., concerts, sporting events, etc.).

In another embodiment, the data used by the system 100 to calculate the payload survivability estimate over a geographic area and/or route/re-route/react/etc. may include the payload type of the payload 107. Some characteristics of the payload type that may be considered may include but not limited to:

Value of the payload 107;
Construction of the outside of the payload 107 (e.g. cardboard box, plastic case, etc.)
The sensitivity of the payload 107 (e.g. secret data, medicine, etc.)

In one embodiment, the system 100 enables human and machine pilots or other operators of drones 101 to calculate the payload survivability estimate by identifying map features 105 and/or the material(s) the map features 105 are comprised. To calculate a payload survivability estimate, the system 100 can model the probability the payload 107 will be functional following an impact of the payload 107 during flight. The probability a payload 107 will be functional is dependent, for instance, on the type of material the map feature 105 is comprised of and the altitude the drone 101 is flying at. For example, a payload 107 may be functional after an impact with a wheat farm from a high altitude but the payload 107 may not be functional after an impact with an asphalt street from the same or lower altitude. This data model of the payload survivability estimate can then be combined with terrain data to identify locations where a payload 107 will be functional following an impact.

For instance, in an example scenario, data for a given geographic location indicates that there is an asphalt street 105d with a row brick buildings 105a on one side of the street 105d and a row of aluminum siding buildings 105a on the other side of the street 105d. (e.g., based on historical data or sensor data from a drone 101 that had previously passed over the area). The system 100 has calculated the payload survivability estimate. The system 100 further determines that there is a farm north of the aluminum siding buildings 105a. Thus the system 100 may determine that the best aerial route with the highest probability a payload 107 would be functional if the payload 107 fell from the drone 101 would be over the aluminum siding buildings 105a and then over the farm. If it was preferred that the payload 107 does not survive the fall, then the system 100 would route the drone 101 over the row of brick buildings and then follow the street 105*d*.

In one embodiment, the system 100 may re-route the drone 101 based on updated sensor data or map data. For example, if a drone 101 is equipped with LiDAR, the LiDAR may detect and determine that what was previously identified to be an aluminum siding building is actually a concrete building. The system would then calculate and update the payload survivability estimate and re-route the drone 101 based on the LiDAR detection. In another embodiment, the system 100 may re-route the drone 101 based on the location or proximity to a payload recovery entity. A service provider may post payload recovery entities in various locations in the event of a malfunction. Thus routing a drone 101 over the locations of a payload recovery entity would allow for lost payloads 107 to be recovered quickly and easily.

In one embodiment, the system 100 can then represent or visualize the calculated probability as a "probability data layer" of the geographic database 123 for the map features 105 identified in a geographic area where the drones 101 will fly over. In one embodiment, the visual representation or "probability data layer" highlights or otherwise indicates the probability along the route that a map feature 105 comprised of a material could destroy the payload 107 being delivered when a drone 101 operates over the geographic area represented by the probability data layer. In other embodiments, the probability data layer is a combination of probabilities composed of one or more other factors (e.g., visible or invisible) associated with the geographic area including but not limited to a wind speed, visibility, weather, etc. in combination with the probability the payload 107 will be functional. In another embodiment, the probability may be associated with the probability that the drone 101 would experience a malfunction or lose control of the payload 107.

On example representation of the "probability data layer" is a payload survivability volume over an area of interest. When rendered on or near a corresponding location (e.g., a building 105*a*, a playground 105*b*, a hill 105*c*, etc.), the volume can appear as a "payload survivability column" rising from the location, so that the aerial vehicle 101 or its operator can visualize the payload survivability from as a "virtual object" to avoid in a similar manner to other physical obstacles (e.g., buildings), in one embodiment. In another embodiment, the volume can appear as a "payload survivability heat map" on the ground.

As indicated above, the extent of the volume of the payload survivability estimate represents the aggregated probability the payload 107 will be functional for a given location in the geographic area. For the example, the height and/or color of the visual representation of the probability data layer can be scaled to be proportional to the calculated probability level for the area. In one embodiment, the height or color of the probability data layer is a function of time and hence creates a user interface with a dynamic landscape of multiple probability data layers that go "up and down" over the course of the day or other period of time to reflect the frequently changing patterns of the payload survivability estimate for an area of interest such as but not limited to the map features, 105 the material comprising the map feature 105, and/or any other parameters that can affect whether the payload 107 is functional after impacting the map feature 105.

In one embodiment, the system 100 also includes a capability to dynamically predict a probability that a payload 107 would impact a human (e.g., in real-time) for a given area based on collecting data from various data sources of human activity in the area, and then using the data to make the predictions of the probability. In one embodiment, dynamic prediction of a payload 107 impacting a human on the ground refers to predicting or estimating the human population density for an area that can differentiate based on dynamic factors such as but not limited to time (e.g., estimate population density with respect to days, weeks, time of day, seasonality) and expected future events (e.g., sporting events, concerts, festivals, etc.). By analogy, dynamic prediction of a payload survivability estimate refers to predicting or estimating the animal population density (e.g., birds, monkeys, etc.) for an area that can differentiate based on dynamic factors such as but not limited to time (e.g., estimate population density with respect to days, weeks, time of day, seasonality) and expected future events (e.g., animal migration, etc.).

In one embodiment, with respect to a drone 101 use case, a payload survivability estimate data along with other factors affecting the probability the payload 107 is functional can be used to predict the levels of probability in areas wherein the drone 101 will fly over. In other words, the system 100 enables the capability to quantify the levels of probability that the drone 101 may meet on the way by generating a probability data layer or a probability data model of the aggregated probabilities of areas at a time when the drone 101 is predicted to fly over the areas. In one embodiment, the system 100 can then route the drone 101 to avoid areas with probability levels above a threshold value or determine a route along which the drone 101 is expected to fly over a minimum level of probability. In this way, the probability a payload 107 is not functional after impact is reduced by reducing the amount of time flown over a map feature 105 that is correlated to a high probability that the payload 107 will not be functional in the event a drone 101 loses control of the payload 107.

Figure 2:
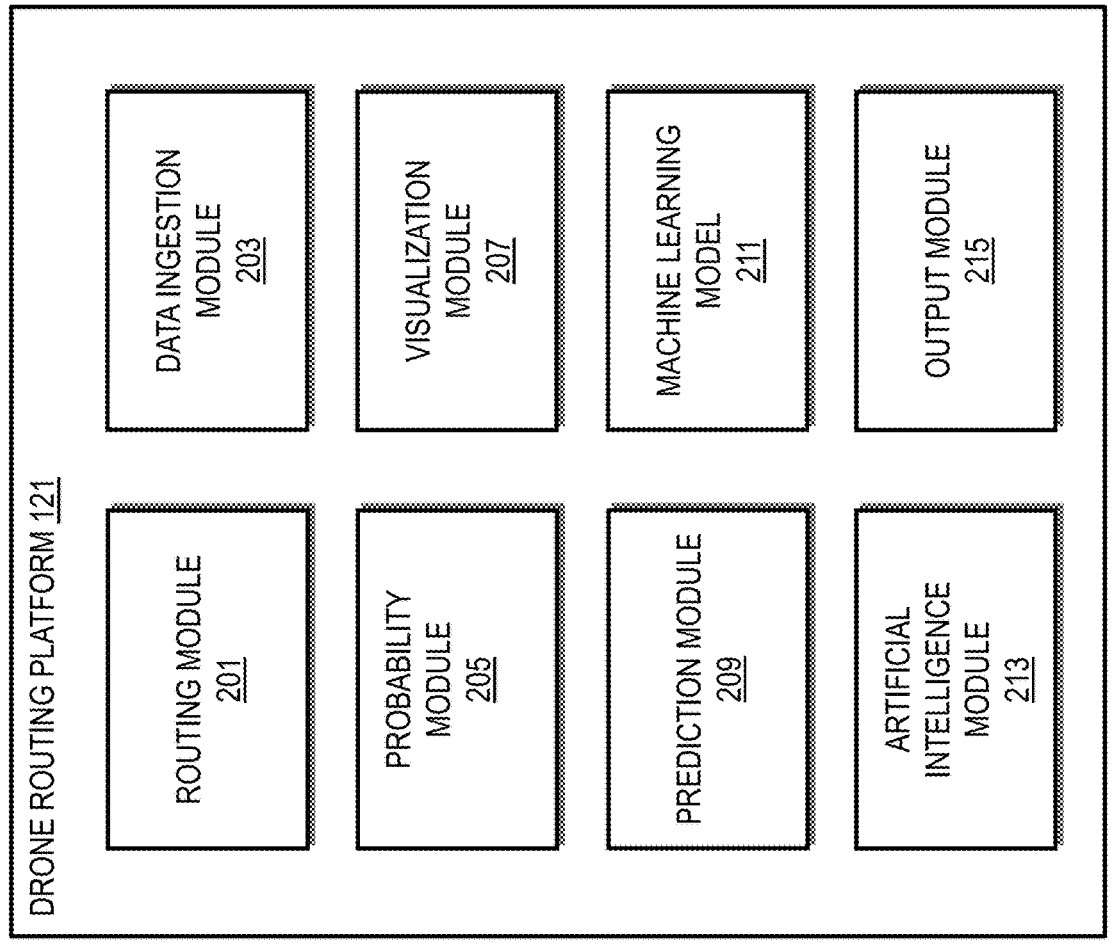
FIG. 2 is a diagram of the components of a drone routing platform, according to one embodiment.

In one embodiment, the drone routing platform 121 includes one or more components for providing a payload survivability estimate modeling according to the various embodiments described herein. As shown in FIG. 2, the drone routing platform 121 includes a routing module 201, a data ingestion module 203, a probability module 205, a visualization module 207, a prediction module 209, a machine learning model 211, an artificial intelligence module 213, and an output module 215. The above presented modules and components of the mapping platform 121 can be implemented in hardware, firmware, software, or a combination thereof. It is contemplated that the functions of these components may be combined or performed by other components of equivalent functionality. Though depicted as a separate entity in FIG. 1, it is contemplated that the drone routing platform 121 may be implemented as a module of any of the components of the system 100 (e.g., a component of the drone 101 and/or a client device such UE 109). In another embodiment, the drone routing platform 121 and/or one or more of the modules 201-215 may be implemented as a cloud-based service, local service, native application, or combination thereof. The functions of these modules are discussed with respect to FIGS. 3-4 below.

Figure 3:
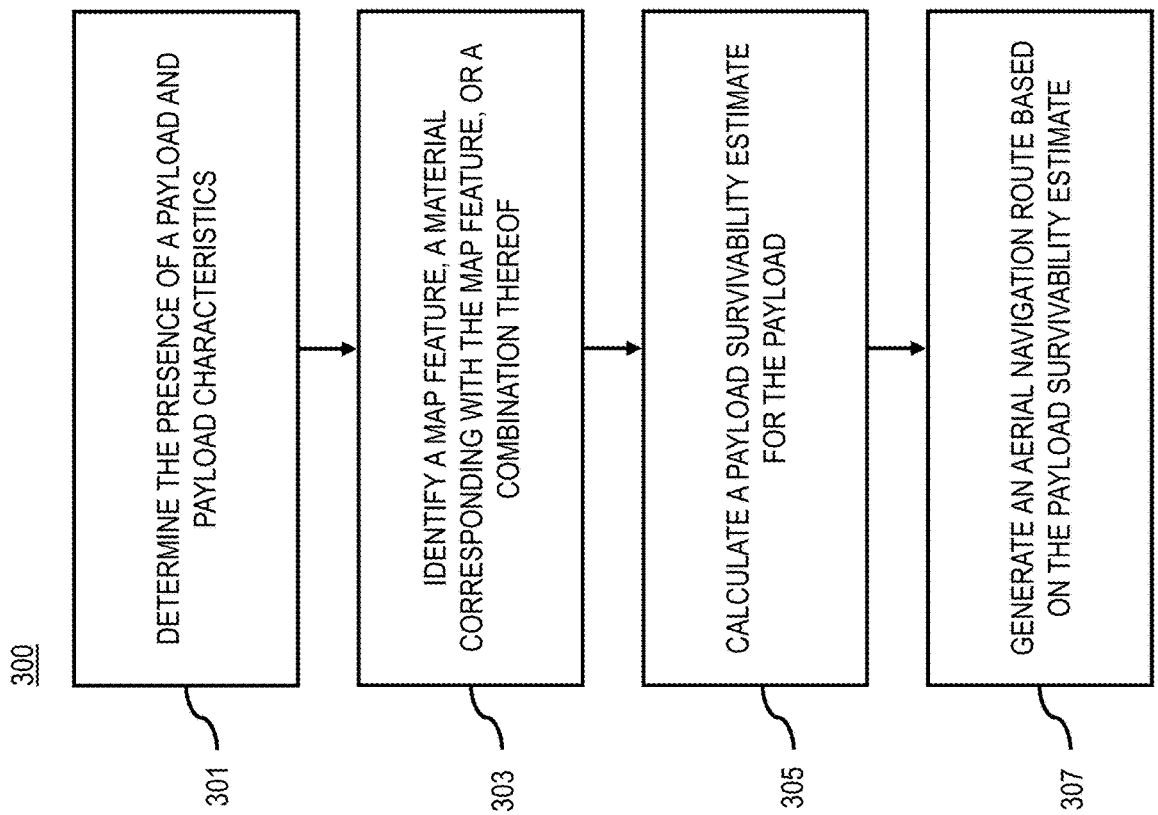
FIG. 3 is a flowchart of a process for generating an aerial navigation route based on a payload survivability estimate, according to one embodiment.
Figure 7:
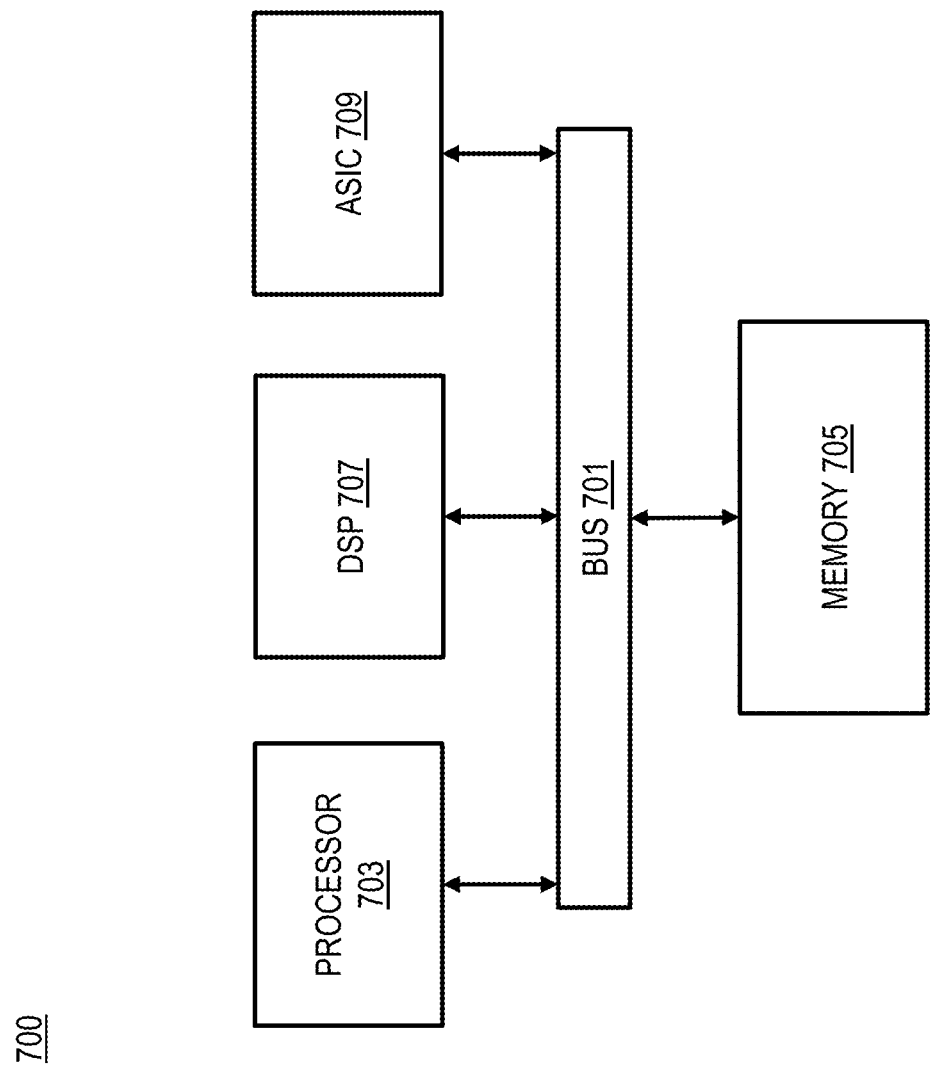
FIG. 7 is a diagram of a chip set that can be used to implement an embodiment.

FIG. 3 is a flowchart of a process for calculating a payload survivability estimate and generating aerial routes, according to one embodiment. In various embodiments, the drone routing platform 121, any of the modules 201-215 of the drone routing platform 121, and/or a local component of the drone 101 may perform one or more portions of the process 300 and may be implemented in, for instance, a chip set including a processor and a memory as shown in FIG. 7. As such, the drone routing platform 121, any of the modules 201-215 of the drone routing platform 121, and/or the local component of the drone 101 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In step 301, the probability module 205 receives payload data indicating the presence of a payload 107 and the characteristics of the payload 107. In one embodiment, the characteristics of the payload 107, could include but is not limited to, the value of the payload 107, the sensitivity of the payload 107, and the construction and materials used for the packaging of the payload 107. In one embodiment, the data ingestion module 203 retrieves information input by the drone operator or service provider indicating the value of the payload 107, the sensitivity of the payload 107, and the construction and materials used for the packaging of the payload 107.

In step 303, the probability module 205 identifies map features 105 and materials corresponding with, or comprising the map features 105 over a geographic area. In one embodiment, the data ingestion module 203 retrieves real-time data, historical data, or a combination thereof identifying map features 105 and materials comprising the map features 105 and calculates the payload survivability estimate based on the real-time data, the historical data, or a combination thereof.

In one embodiment, the probability module 205 determines the payload survivability estimate based on real-time sensor data collected from a sensor of the drone 101. In other embodiments, the sensor of the drone 101 is but not limited to LiDAR.

In one embodiment, the data ingestion module 203 can sense, determine, retrieve, and/or query a geographic database 123 or equivalent for the any of the probability factor data. In step 305, the payload survivability volume data can be calculated by the probability module 205 according to probability factor data that can result in increased risks of injury or casualty if the drone 101 loses control of the payload 107 in the area during a flight. In another example, the payload survivability volume data can be calculated by the probability module 205 according to probability factor data that can maximize the payload survivability estimate. In another example, the payload survivability volume data can be calculated by the probability module 205 according to probability factor data that can minimizes the payload survivability estimate.

In another embodiment, the probability factor data includes event/location data indicating a presence of or a number of events and/or event locations in which the payload 107 may impact in the geographic area. By way of examples, such events and event locations include professional, collegiate, interscholastic football; baseball; soccer; lacrosse; basketball, tennis, volleyball courts/fields; Olympics competitions, elementary, middle school, high school playground areas; neighborhood parks; archery parks; blimps/hot air balloons festivals; etc. In one embodiment, the data ingestion module 203 retrieves land usage data to determine the location of construction sites, the progress of a farm (e.g. no vegetation, i.e. dirt or plants present), etc.

A probability a payload 107 will be functional following an impact may be represented by a payload survivability zone. For example, the payload survivability zone can be defined as a color or any other shape (e.g., rectilinear polygon, dome, Voronoi shape, etc.) forming a location of the payload survivability estimate.

In step 305, the prediction module 209 calculates a payload survivability estimate and the visualization module 207 generates a representation of the payload survivability zones as a probability data layer based on the calculated payload survivability estimate. In one embodiment, the extent of the shape or the color of a payload survivability zone is represented by or corresponds to the map feature 105 and/or material comprising the map feature 105 in a payload survivability zone.

Figure 4A:
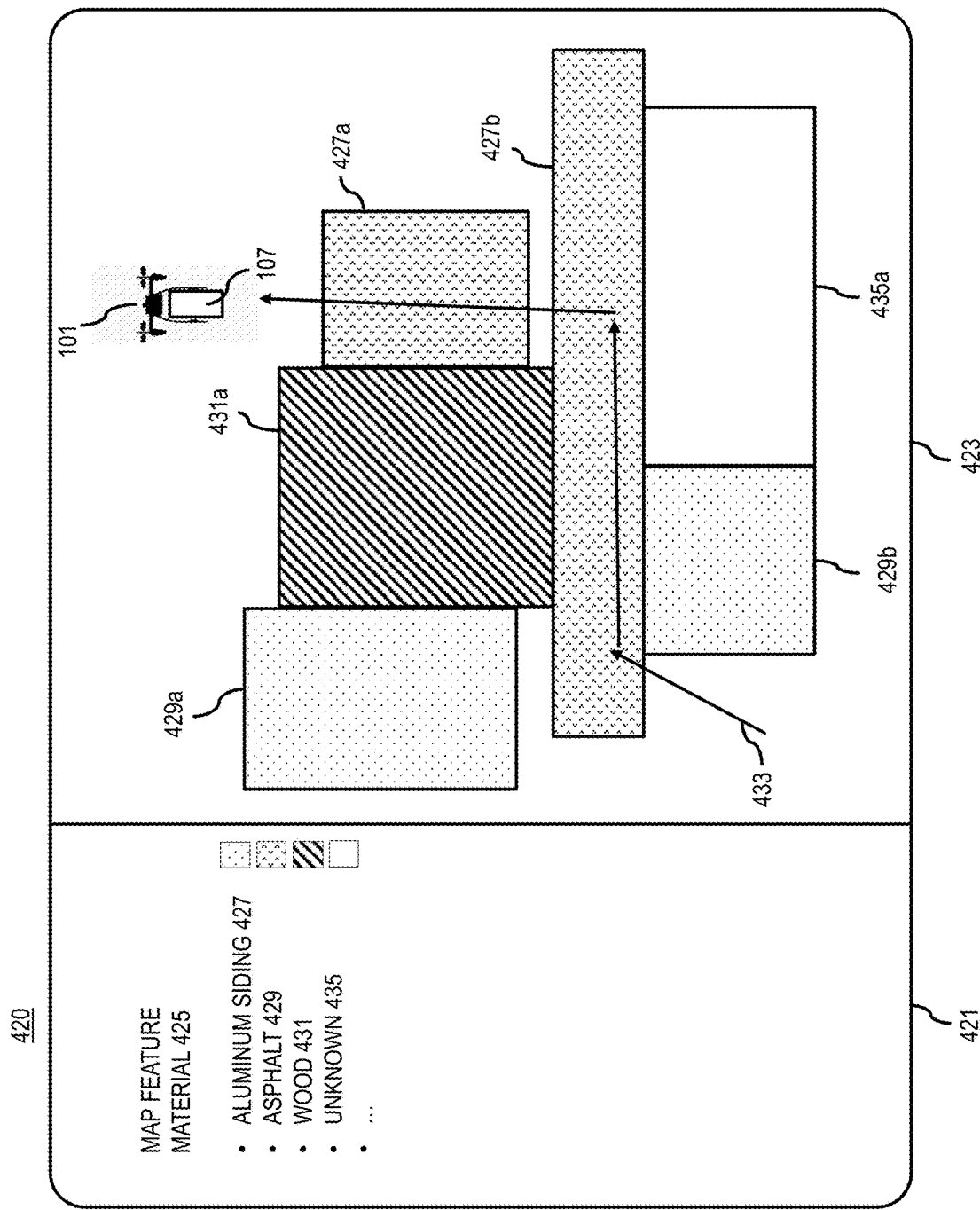
FIG. 4A is a diagram of a user interface illustrating map features and the material comprising the map features within a geographic area, according to one embodiment.

FIG. 4A is a diagram of a user interface illustrating map features 105 and the material comprising the map features 105, according to one embodiment. In FIG. 4A, the user interface (UI) 420 includes a first element 421 for presenting information on different materials that comprise a map feature 105 and a second element 423 for presenting the extent and location of the map features 105 and the material comprising the map feature 105. For example, the first element 421 lists different map feature data layers 425 for different materials, such as aluminum siding 427, asphalt 429, wood 431, etc. If a map feature 105 of a particular area is unknown, an unknown data layer 435 is presented on the user interface 420. FIG. 4A shows two aluminum siding zones 427a and 427b, two asphalt zones 429a and 429b, one wood zone 431a, and one unknown zone 435a on the UI 420.

By way of example, given thresholds on confidence levels and/or number of registrations and/or observations of an extent or location of a map feature 105, i.e. a payload survivability zones, in the geographic area, the probability module 205 determines the probability a payload 107 is functional following a fall from a drone 101 in respective payload survivability zones, while the size or shape of a payload survivability zones reflects the extent and location of a map feature 105. In one embodiment (e.g., FIG. 4A), the visualization module 207 generates a representation of the probability zones of all types of map features 105 and materials the map features are comprised of In another embodiment, the visualization module 207 generates a representation of the payload survivability zones as a probability data layer per type of map feature 105 and per type of material. In another embodiment, the visualization module 207 generates an unknown zone 435a where the probability module 205 is unable to calculate the probability a payload 107 is function after falling from a drone 101 due to map data being unavailable.

In one embodiment, the visualization module 207 can use a trained machine learning model 211 or equivalent to predict a probability level for a given payload survivability zone based on the aggregated probability factors of the area. For example, the trained machine learning model 211 can be trained using aggregated ground truth probability-related data that has been labeled or annotated with a known or ground-truth probability level. The probability factors aggregated from the geographic area can be used as input features to the trained machine learning model 211 to output a probability level prediction and optionally a corresponding confidence level of the prediction.

Ideally, for trip planning, a pilot/controller would pick a route which has a low probability volume or probability data layer on the flight path (e.g., a flight path with a low payload survivability estimate). By way of example, the flight path 433 can be drawn or computed to avoid passing through any payload survivability zones of one or more of the probability data layers that forecast a high probability that a payload 107 would not be functional. In one embodiment, a payload survivability zone is avoided horizontally by flying around on the same plane. In another embodiment, a payload survivability zone is not avoided horizontally by flying over the same plane. For example, a payload survivability zone with a high probability the payload 107 would not be functional would not be avoided if the payload 107 is secret data or medication. The routing module 201 can determine a required altitude change based on the data model representing the payload survivability estimate in combination with terrain data for the geographic area. In one embodiment, the routing module 201 retrieves a ground elevation or equivalent terrain data of a location that the drone 101 is to fly over or to approach within a distance threshold. This ground elevation or terrain data can be retrieved from, for instance, the geographic database 123 or other equivalent data store providing ground elevation data. The routing module 201 can then interact with the prediction module 209 to predict the type of map features 105 (e.g., a brick building) that may be encountered at or within a distance threshold of the location according to the embodiments described herein. Based on the prediction, the probability module 205 determines a probability a payload 107 would function after impact in the geographic area. Using the ground elevation data and the probability a payload 107 would function after impact, the routing module 201 can determine an altitude or altitude change (e.g., how much lower the drone 101 has to fly on a route to ensure a payload 107 would function after impact with a given map feature 105 to generate a route over the location. For example, if a location has a ground elevation of 100 feet above sea level and the drone routing platform 121 determines that a payload 107 would not be functional from a fall of 50 feet at the location, the drone routing platform 121 can generate a flight path 433 that takes an drone 101 between 100 and 150 feet to ensure the payload 107 is still functioning should the drone 101 lose control of the payload 107.

In another embodiment, if the payload 107 is sensitive (e.g. medicine or secret data), the routing module 201 can further consider the probability the payload 107 will not be functional when determining an altitude or vertical adjustment to ensure the payload 107 is destroyed on impact. For example, the drone routing platform 121 determines that a location has a ground elevation of 100 and has a brick building as the map feature 105. As in the example above, the drone routing platform 121 also predicts the payload 107 would not be functional from a fall of 50 feet at the location. Accordingly, the drone routing platform 121 can generate a flight path 433 that includes the drone 101 flying at over 150 feet above the location.

If a payload survivability zone cannot be avoided, the pilot/controller could then take the flight path 433 with the lower probability (e.g., flying over map features 105 with a lower payload survivability estimate but at a lower altitude). This is especially useful when the pilot/controller needs to adapt to changing conditions while flying (e.g., during re-routing of a flight path) as the pilot will need to make very quick decisions on-the-fly.

In one embodiment, the drone routing platform 121 uses the ability of a computer program (or software) or a neural network (artificial intelligence) of the drones 101 to create an optimal delivery route, react in real-time and/or reroute (or recreate route) the drones 101 based on historical and real-time data and intelligence combined with real-time edge decision (such as split-decision, decision-point, cloud-decision) making at critical decision points for ensuring success of deliveries.

Figure 4B:
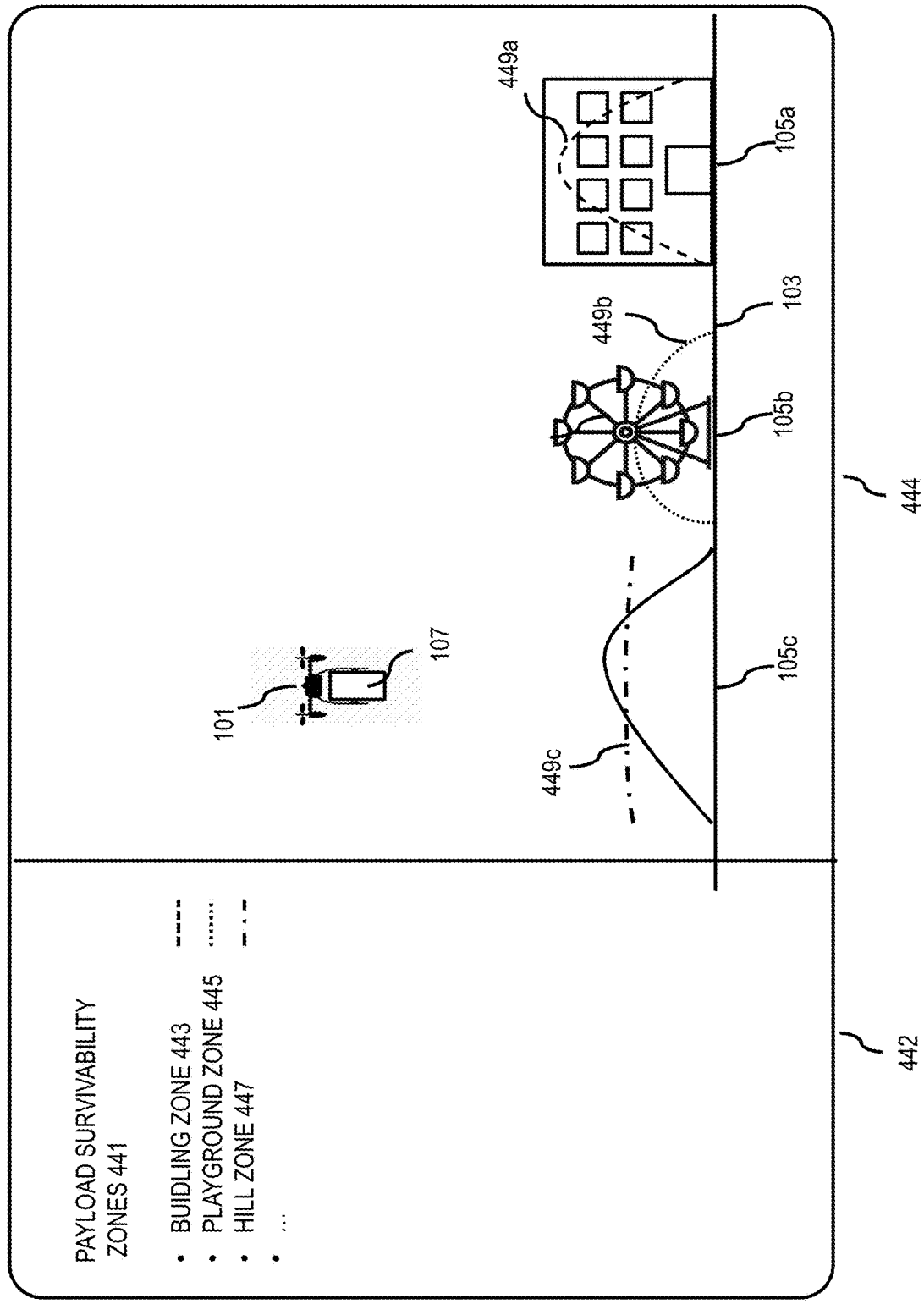
FIG. 4B is a diagram illustrating an example payload survivability estimate data model, according to one embodiment.

FIG. 4B is a diagram illustrating an example payload survivability estimate, according to one embodiment. In one embodiment, the visualization module 207 generates the representation of a payload survivability estimate that considers a vertical 3D flight path 433 zone that a payload 107 will be functional following an impact extending over a height of a 3D map feature (e.g., a building 105a, a playground 105b, a hill 105c, etc.).

In FIG. 4B, the UI 440 includes a first element 442 for presenting information on different payload survivability zones and a second element 444 for presenting a payload survivability data model. For example, the first element 442 lists different payload survivability zones 441, such as an area of a map feature 105. For example, the height of the payload survivability data layer of one type of map feature 105 can be proportional to the material the map feature 105 is comprised of. FIG. 4B shows a payload survivability distribution 449a with respect to the building 105a, a payload survivability distribution 449b with respect to the event at the playground 105b, and a payload survivability distribution 449c with respect to the hill 105c on the UI 440.

In FIG. 4B, the drone routing platform 121 aggregates and presents the distributions of the respective survivability of a payload 107 will be functional over the respective map features 105 as a payload survivability estimate, for a time associated with the drone 101 to pass the geographic area. For example, the payload survivability zone 441 includes a building zone 443, a playground zone 445, and a hill zone 447. In this example, the a payload survivability distribution 449c for the hill zone 447 covering the whole hill 105c has a higher payload survivability estimate, while the playground zone 449b has a lower payload survivability estimate due to a lower probability a payload 107 would be functional after a fall, because the probability a payload 107 is functional after impacting the grassy hill 105c is greater than the probability a payload 107 is functional after impacting a metal playground set. In another example, the walls of the building 105a are made of concrete while the roof is made of aluminum. In this example, the walls forming the exterior of the building have a low payload survivability estimate while the probability of a payload functioning after an impact with the roof is higher. The drone 101 can avoid a payload survivability zone 441 in a similar manner to physical obstacles (e.g., buildings).

In one embodiment, the prediction module 209 creates a data model representing a payload survivability estimate. In one instance, the map data layer further includes the data model. In another instance, the data model includes the map data layer.

In step 307, the routing module 201 generates an aerial navigation route based on the payload survivability estimate. By way of example, the routing module 201 routes a drone 101 over the geographic area based on the map data layer. The route can be determined using any routing engine known in the art based on an origin and destination specified by a pilot/controller of the drone 101 for the route at a given time (e.g., expected start time of the route). In one embodiment, the drone 101 is a delivery drone.

Ideally, for route planning, a pilot/controller would pick a route which entails the drone 101 flying over a higher payload survivability estimate. If that is not possible, the pilot could then take the route with the lowest risk (e.g., flying over map features 105 with a lower payload survivability estimate but at a lower altitude). This is especially useful when the pilot/controller needs to adapt to changing conditions while flying (e.g., during rerouting of a flight path) as the pilot will need to make very quick decisions on-the-fly.

In one embodiment, the route is calculated using a cost function based on minimizing the payload survivability estimate of the drone 101 based on a probability that a payload 107 will not be functional after impact with a map feature 105 over the geographic area. In another embodiment, the route is calculated using a cost function based on maximizing the payload survivability estimate of the drone 101 based on a probability that a payload 107 will be functional after impact with a map feature 105 over the geographic area.

In one embodiment, the data model is further based on real-time sensor data from a sensor of the drone 101, and the routing is further based on the sensor data. In other embodiments, the sensor of the drone 101 is but not limited to LiDAR.

In one embodiment, the prediction module 209 or the local component of the drone 101 calculates a probability a payload 107 will be functional following an impact with a map feature 105 based on the map data, and the routing module 201 initiates an activation of at least one sensor of the drone 101. For instance, the at least one sensor is configured to collect sensor data for detecting a presence of a map feature 105, such as a building 105a or road 105d, and determining the material the map feature 105 is comprised of. By way of example, a LiDAR sensor can be used to identify the composition of a material used on the side of a building 105a, to determine a payload survivability estimate, and then re-route the drone 101 based on the updated payload survivability estimate.

In another embodiment, based on the probability that a payload 107 will be functional following an impact with a map feature 105, the routing module 201 or the local component of the drone 101 initiates an evasive maneuver by the drone 101 based on determining that probability is greater than a threshold probability. By way of example, the drone 101 flies above, around, or below the one or more payload survivability zones in the data model. In another example, the drone 101 flies via the one or more payload survivability zones at a lower altitude to increase the probability a payload 107 will be functional. In another example, the drone 101 flies via the one or more payload survivability zones at a lower flight speed to increase the probability a payload 107 will be functional. In another example, the drone 101 flies via the one or more payload survivability zones in close proximity to a payload recovery entity to increase the probability a payload 107 will be functional.

In another embodiment, the routing module 201 calculates a probability that a payload 107 is functional following an impact based on the map data and initiates an activation of at least one sensor (e.g. LiDAR) of the drone 101. The at least one sensor is configured to collect sensor data for determining the material of a map feature 105. In yet another embodiment, the routing module 201 uses the sensor data to update the map data indicating the map features 105 and/or the material the map feature 105 is made of, such as one or more LiDAR sensors detecting the material associated with a map feature 105 (e.g., aluminum siding building), etc.

In yet another embodiment, the routing module 201 calculates a probability a payload 107 will be functional following an impact with a map feature 105 based on the map data and initiates an evasive maneuver by the drone 101 based on determining a payload survivability estimate. By way of example, the drone 101 flies above, around, or below the one or more payload survivability zones in the data model. In another example, the drone 101 flies via the one or more payload survivability zones at a lower altitude to increase the probability a payload 107 will be functional. In another example, the drone 101 flies via the one or more payload survivability zones at a lower flight speed to increase the probability a payload 107 will be functional. In another example, the drone 101 flies via the one or more payload survivability zones in close proximity to a payload recovery entity to increase the probability a payload 107 will be functional.

In one embodiment, electromagnetic field data can be sensed used using sensors located on drones 101, in the infrastructure (e.g., smart city infrastructure), and/or from any other sensor in the area of interest. In addition or alternatively, historical or previously sensed electromagnetic data that has been stored for the areas of interest along the flight path can be stored and retrieved from the geographic database 123. Data on the absence of GPS or other location signals in the areas of interest can also be sensed or retrieved from the geographic database 123. Areas with no or low GPS reception or equivalent (e.g., areas with high multi-path signal interference) can cause the drone 101 to have inaccurate positioning information. Weather data (e.g., winds or other weather conditions) can be retrieved from weather services or applications provided by the services platform 113 and/or any of the services 115a-115n. Wind or weather conditions that exceed the operational capability of the drone 101 can cause the drone 101 to be more susceptible to being blown off course or into other objects, or from weather related damage (e.g., lightning strikes, hail damage, snow, etc.). Network coverage data can be retrieved from the communication network 111, services platform 113, and/or services 115a-115n. Network coverage data can include cellular or other data network signal strength or availability. Losing communications connections between the drone 101 and a corresponding remote pilot, remote operator, or remote data service can increase safety risks. Finally, aviation-related data such as air traffic, flight restrictions, etc. can be retrieved from the services platform 113, services 115a-115n, and/or geographic database 123. By way of example, increased air traffic in the geographic can increase safety risks of colliding with other aerial vehicles or drones 101. In one embodiment, the services 115a-115n can be provided by content providers 117a-117m through the communication network 111.

It is noted that the above probability factors are provided by way of illustration and not as limitations. It is contemplated that data on any other location-based probability factor that can affect whether a payload 107 would be functional if recovered can be sensed/retrieved and incorporated into the payload survivability data layer and/or payload survivability risk data model according to the described embodiments.

Visualization or rendering of the payload survivability data layer could be offered on a plurality of user interfaces for various purposes including but not limited to: (1) an application for trip planning (e.g., on a desktop computer or device); (2) an augmented reality (AR) view for live visualization by the pilot, co-pilot, and/or any other user; (3) an on-device dashboard interface; (4) an autonomous system use (e.g., for a pilot/controller of the aerial vehicle 101, other data post processing uses, etc.); and/or the like.

In one embodiment, as described above, the calculated payload survivability estimate for the areas of interest can be time sensitive. In other words, the probability a payload 107 is functional after an impact can be a function of time by updating the probability-related data collected from the areas of interest in real-time, continuously, periodically, according to a schedule, or a combination thereof. The updated probability-related data or probability factors can then be used to update the payload survivability data layer and/or the payload survivability data model associated with the flight path. In this way, the visualization module 207 can dynamically adjust at least one dimension (e.g., height) of the payload survivability data layer/model as function of time.

The embodiments of visualizing probability levels or aerial vehicle flights described herein provide for several advantages. For example, quickly presenting or displaying probability increases the likelihood a payload 107 is functional should the payload 107 fall from a drone 101. The unique visualization also is more convenient and efficient for pilots/controllers to plan flying journeys. The intuitive presentation also enables faster reaction time for pilots/controllers who need to react to changing conditions during a flight. As another advantage, the embodiments of probability data layers/models which is often invisible to the naked eye.

Although the various embodiments are discussed with respect to aerial flights, it is contemplated that the embodiments for visualizing probability levels can be used for other applications such as but not limited to determining insurance coverage, and/or any other application where aggregated probabilities are to be visualized.

The geographic area can include any location or area for which a payload survivability estimate is to be calculated. The area can be specified as a point location with a surround radius, as a bounded area, etc. The area of interest can also be specified as a point of interest (e.g., a building, structure, park, etc.) or geopolitical boundary (e.g., neighborhood, city, state, region, country, etc.). In one embodiment, the data ingestion module 203 retrieves or otherwise determines map feature data for the location. The map feature data includes any data that can be sensed, reported, recorded, stored, etc. that is associated with or indicative of any map feature 105 or the material comprising the map feature 105 within the area of interest.

An impact can include but is not limited to a crash, a fall, a takedown, a graze, and or any other contact with the payload 107 during the route that decreases the probability the payload 107 will be functional.

In one embodiment, the payload survivability estimate is generated based on a trained machine learning model 211. The trained machine learning model 211, for instance, is trained using a ground truth data correlating reference historical data to a ground truth payload survivability estimate. Accordingly, in one embodiment, the data ingestion module 203 can acquire ground truth data from one or more locations that are similar to expected areas of interest. The ground truth data, for instance, correlates reference historical payload survivability estimate data to ground truth payload survivability estimate data. Reference historical payload survivability estimate data includes one or more input data sources with known values or parameters. The set of known payload survivability estimate data values can be referred to as ground truth input feature sets. These feature sets can then be labeled with ground truth payload survivability estimate data that reflects known payload survivability estimate data or payload survivability estimate data that has been accepted or otherwise treated as the true payload survivability estimate of an area exhibiting the reference data values.

As discussed above, the machine learning model 211 uses training or ground truth data to automatically "learn" or detect relationships between different input feature sets and then output a predicted payload survivability estimate based on those feature sets. In one embodiment, at least one of the input features or values includes a temporal parameter that indicates the times at which the ground input feature sets and corresponding ground truth payload survivability estimate was collected or determined. In this way, the trained machine learning model 211 can include time as a dynamic parameter so that the machine learning model 211 can learn the relationship between payload survivability estimate and time. For example, the dynamic parameter can provide for the prediction of the payload survivability estimate with respect to a time of day, a day, a week, a season, a year, or a combination thereof.

In one embodiment, the machine learning model 211 can be trained using the acquired ground truth training data set. For example, the drone routing platform 121 can incorporate a supervised learning model (e.g., a logistic regression model, Random Forest model, and/or any equivalent model) to provide feature matching probabilities that are learned from the training data set. For example, during training, the prediction module 209 uses a learner module that feeds input feature sets from the ground truth training data set into the machine learning model 211 to compute a predicted payload survivability estimate using an initial set of model parameters. The learner module then compares the predicted matching probability of the predicted payload survivability estimate to the ground truth payload survivability estimate data for each input feature set in the ground truth training data set. The learner module then computes an accuracy of the predictions for the initial set of model parameters. The prediction of the payload survivability estimate can then be further based on the relative weighting information among the input features to train the machine learning model 211.

To use the trained machine learning model 211 to make predictions, the prediction module 209 selects or receives an input for selecting a time for which the dynamic payload survivability estimate is to be made. The selected time can be any time in the future or the past. For example, in a drone 101 use case, a future time can be selected to correspond to when the drone 101 is expected to arrive or fly over the selected area of interest to assist in assessing a payload 107 would be functional follow an impact within a geographic area.

In one embodiment, after generating the payload survivability estimate, the output module 215 can generate a visual representation of the payload survivability estimate. Examples of such a visual representation is shown in FIGS. 4A-4B.

Returning to FIG. 1, as shown, the system 100 comprises a drone 101 equipped with a variety of sensors that is capable operating in airspaces overpopulated or unpopulated areas. In one embodiment, the drone 101 can fly or otherwise operate autonomously or under direct control via the UE 109 that may include or be associated with one or more software applications 119 supporting routing based on probabilities and/or visualizations according to the embodiments described herein. As previously discussed, the system 100 further includes drone routing platform 121 coupled to the geographic database 123, wherein the drone routing platform 121 performs the functions associated with visualizing probability levels, calculating payload survivability estimates, and/or drone routing as discussed with respect to the various embodiments described herein. In one embodiment, the drone 101, drone routing platform 121, UE 109, and other components of the system 100 have connectivity to each other via the communication network 111.

In one embodiment, the drone 101 is capable of operating autonomously or via a remote pilot using UE 109 to fly the drone 101 or configure a flight path or route for the drone 101. In one embodiment, the drone 101 is configured to travel using one or more modes of operation over population or unpopulated areas. The drone 101 many include any number of sensors including cameras, recording devices, communication devices, etc. By way example, the sensors may include, but are not limited to, a global positioning system (GPS) sensor for gathering location data based on signals from a positioning satellite, Light Detection And Ranging (LiDAR) for gathering distance data and/or generating depth maps or identify a material of a map feature 105, a network detection sensor for detecting wireless signals or receivers for different short-range communications (e.g., Bluetooth®, Wireless Fidelity (Wi-Fi), Li-Fi, Near Field Communication (NFC), etc.), temporal information sensors, a camera/imaging sensor for gathering image data, and the like. The drone 101 may also include recording devices for recording, storing, and/or streaming sensor and/or other telemetry data to the UE 109 and/or the drone routing platform 121 for mapping or routing.

In one embodiment, the drone 101 is capable of being configured with and executing at least one route based on visualized probabilities, dynamic population density predictions according to the embodiments described herein. The drone 101 can also be configured to avoid areas with high probability levels, populated areas, objects, and/or obstructions. In addition, the drone 101 can be configured to observe restricted paths or routes. For example, the restricted paths may be based on governmental regulations that govern/restrict the path that the drone 101 may fly (e.g., Federal Aviation Administration (FAA) policies regarding required distances between objects). In one embodiment, the system 100 may also take into account one or more pertinent environmental or weather conditions (e.g., rain, water levels, sheer winds, etc. in and around underground passageways and their entry/exit points) in determining a route or flight path.

In one embodiment, the drone 101 may determine contextual information such as wind and weather conditions in route that may affect the drone's 101 ability to follow the specified route and then relay this information in substantially real-time to the system 100. In one embodiment, the drone 101 may request one or more modifications of the flight path based, at least in part, on the determination of the contextual information or a change in the real-time calculated probabilities over areas of interest (e.g., newly detected or updated probability factors causing a sudden and unexpected change in probabilities). In one embodiment, the system 100 creates a data object to represent the aerial route and may automatically modify the route data object based on receipt of the contextual information from the drone 101 or another source and then transmit the new route object to the drone 101 for execution. In one embodiment, the drone 101 can determine or access the new route data object and/or determine or access just the relevant portions and adjust its current path accordingly. For example, if multiple highly dense population areas (e.g., buildings) are encountered, the system 100 may condense the width of the drone's 101 flight path to better ensure that the drone 101 will avoid the areas where a payload 107 would not be functional following an impact.

By way of example, a UE 109 is any type of dedicated drone control unit, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 109 can support any type of interface to the user (such as "wearable" circuitry, etc.). In one embodiment, a UE 109 may support any type of interface for piloting or routing the drone 101. In addition, a UE 109 may facilitate various input means for receiving and generating information, including, but not restricted to, a touch screen capability, a keyboard and keypad data entry, a voice-based input mechanism, and the like. Any known and future implementations of a UE 109 may also be applicable.

By way of example, the UE 109 and/or the drone 101 may execute applications 119, which may include various applications such as a payload survivability estimate visualization application, an aerial routing application, a location-based service application, a navigation application, a content provisioning application, a camera/imaging application, a media player application, an e-commerce application, a social networking application, and/or the like. In one embodiment, the applications 119 may include one or more feature applications used for visualizing probability levels according to the embodiments described herein. In one embodiment, the application 119 may act as a client for the drone routing platform 121 and perform one or more functions of the drone routing platform 121. In one embodiment, an application 119 may be considered as a Graphical User Interface (GUI) that can enable a user to configure a route or flight path for execution by a drone 101 according to the embodiments described herein.

In one embodiment, the communication network 111 of a system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the drone routing platform 121 can interact with the services platform 113 to receive data (e.g., map features 105 from a plurality of data sources.) for providing routing or operation of the drone 101 based on a payload survivability estimate. By way of example, the services platform 113 may include one or more services 115 for providing content (e.g., human activity data, ground truth data, etc.), provisioning services, application services, storage services, mapping services, navigation services, contextual information determination services, location-based services, information-based services (e.g., weather), etc. By way of example, the services 115*a* may provide or store non-drone traffic schedule data (e.g., train/subway schedules, etc.), weather data, water level schedules, and/or other data used by the embodiments describe herein. In one embodiment, content providers 117*a*-117*m* may provide one or more services 115*a*-115*n* through the communication network 111. In another embodiment, the services platform 113 may interact with the drone 101, UE 109, and/or drone routing platform 123 to supplement or aid in providing a payload survivability estimate.

By way of example, the drone 101, UE 109, drone routing platform 121, and the services platform 113 communicate with each other and other components of the system 100 using well known, new or still developing protocols. In this context, a protocol includes a set of rules defining how the network nodes within the system 100 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload 107 and indicating the end of the payload information. The header includes information such as the source of the packet, its destination, the length of the payload 107, and other properties used by the protocol. Often, the data in the payload 107 for the particular protocol includes a header and payload 107 for a different protocol associated with a different, higher layer of the OSI Reference Model. The header for a particular protocol typically indicates a type for the next protocol contained in its payload 107. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 5:
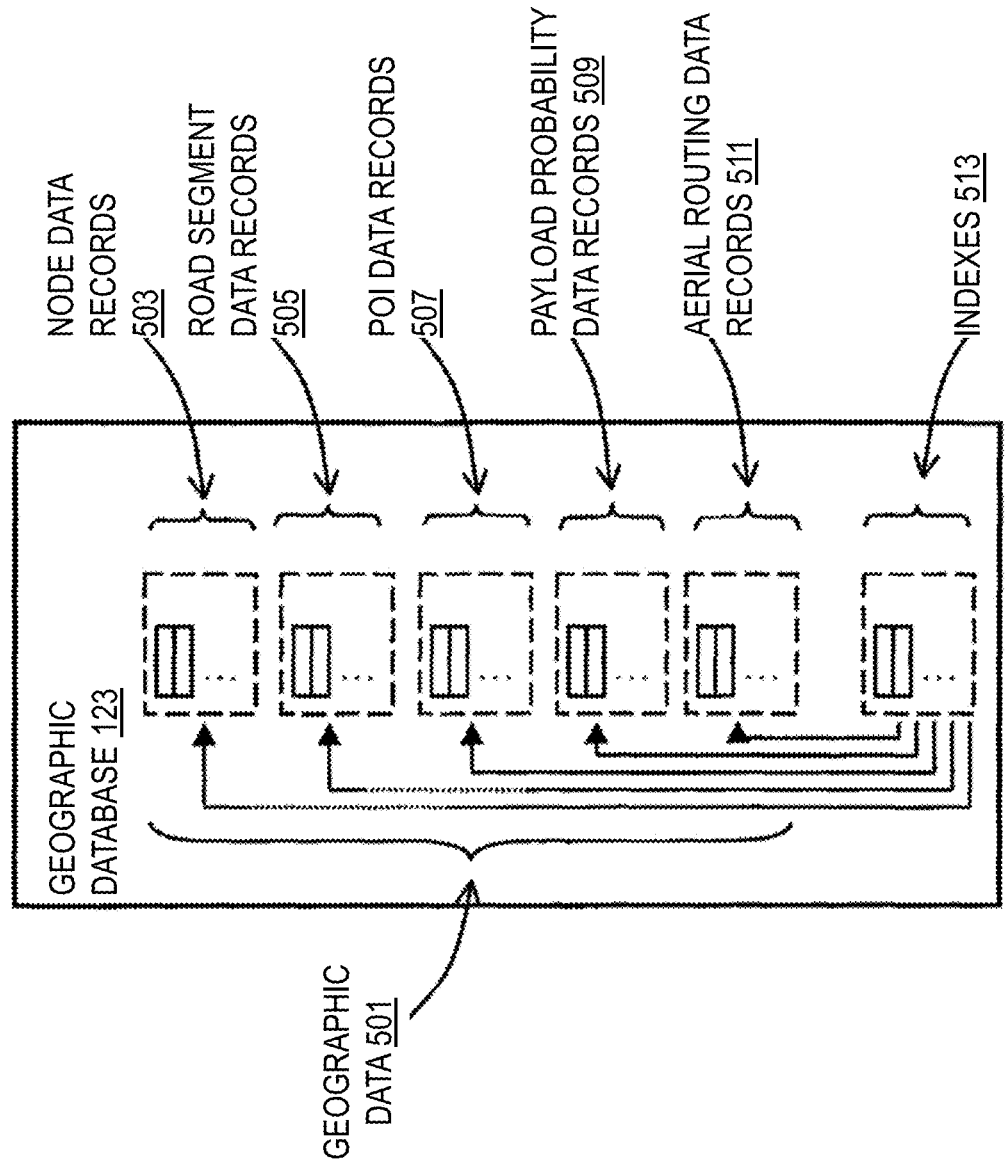
FIG. 5 is a diagram of a geographic database capable of storing map data for drone routing, according to one embodiment.

FIG. 5 is a diagram of a geographic database 123 capable of storing map data for payload survivability estimates, according to one embodiment. In one embodiment, the geographic database 123 includes geographic data 501 used for (or configured to be compiled to be used for) mapping and/or navigation-related services, such as for routing aerial vehicles based on a payload survivability estimate to create a 3D flightpath or route.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 501 of the database 123 includes node data records 503, road segment or link data records 505, POI data records 507, payload probability data records 509, aerial routing data records 511, and indexes 513, for example. More, fewer or different data records can be provided. In one embodiment, additional data records (not shown) can include cartographic ("carto") data records, routing data, and maneuver data. In one embodiment, the indexes 513 may improve the speed of data retrieval operations in the geographic database 123. In one embodiment, the indexes 513 may be used to quickly locate data without having to search every row in the geographic database 123 every time it is accessed. For example, in one embodiment, the indexes 513 can be a spatial index of the polygon points associated with stored feature polygons.

In exemplary embodiments, the road segment data records 505 are links or segments representing roads, streets, or paths, as can be used in the calculated route or recorded route information for determination of one or more personalized routes. The node data records 503 are end points corresponding to the respective links or segments of the road segment data records 505. The road link data records 505 and the node data records 503 represent a road network, such as used by vehicles, cars, and/or other entities. In addition, the geographic database 123 can contain path segment and node data records or other data that represent 3D paths around 3D map features (e.g., terrain features, buildings, other structures, etc.) that occur above street level, such as when routing or representing flightpaths of aerial vehicles (e.g., drones 101), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 507. The geographic database 123 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a position of a city).

In one embodiment, the geographic database 123 can also include risk factor data records 509 for the digital map data representing risk factors or risk-related data, calculated risk levels, risk level visualizations, payload survivability estimates calculated for areas or interest, and related data. In one embodiment, the payload probability data records 509 can be associated with one or more of the node records 503, road segment records 505, and/or POI data records 507 so that the probabilities a payload 107 is functional can inherit characteristics, properties, metadata, etc. of the associated records (e.g., location, address, POI type, etc.). In one embodiment, the system 100 (e.g., via the drone routing platform 121 can use the payload survivability estimates to generate aerial vehicles routes.

In one embodiment, the system 100 is capable of generating aerial routes using the digital map data and/or real-time data stored in the geographic database 123 based on probability visualization and/or predictions. The resulting aerial routing and guidance can be stored in the aerial routing data records 511. By way of example, the routes stored in the aerial routing data records 511 can be created for individual 3D flightpaths or routes as they are requested by drones or their operators. In this way, previously generated aerial routes can be reused for future drone travel to the same target location.

In one embodiment, the aerial routes stored in the aerial routing data records 511 can be specific to characteristics of the drone 101 (e.g., drone type, size, supported modes of operation) and/or other payload survivability estimates characteristics of the route. In addition, the aerial routes generated according to the embodiments described herein can be based on contextual parameters (e.g., time-of-day, day-of-week, season, etc.) that can be used to different payload survivability estimates according to the embodiments described herein.

In one embodiment, the geographic database 123 can be maintained by the services platform 113, any of the services 115 of the services platform 113, and/or the drone routing platform 121). The map developer can collect geographic data to generate and enhance the geographic database 123. There can be different ways used by the map developer to collect data. These ways can include obtaining data from other sources, such as municipalities or respective geographic authorities. In addition, the map developer can employ drones 101 (e.g., using the embodiments of the privacy-routing process described herein) or field vehicles (e.g., mapping drones or vehicles equipped with mapping sensor arrays, e.g., LiDAR) to travel along roads and/or within buildings/structures throughout the geographic region to observe features and/or record information about them, for example. Also, remote sensing, such as aerial or satellite photography or other sensor data, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the drone 101, for example. The navigation-related functions can correspond to 3D flightpath or navigation, 3D route planning for package delivery, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for mapping payload survivability estimates and generating aerial routes may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
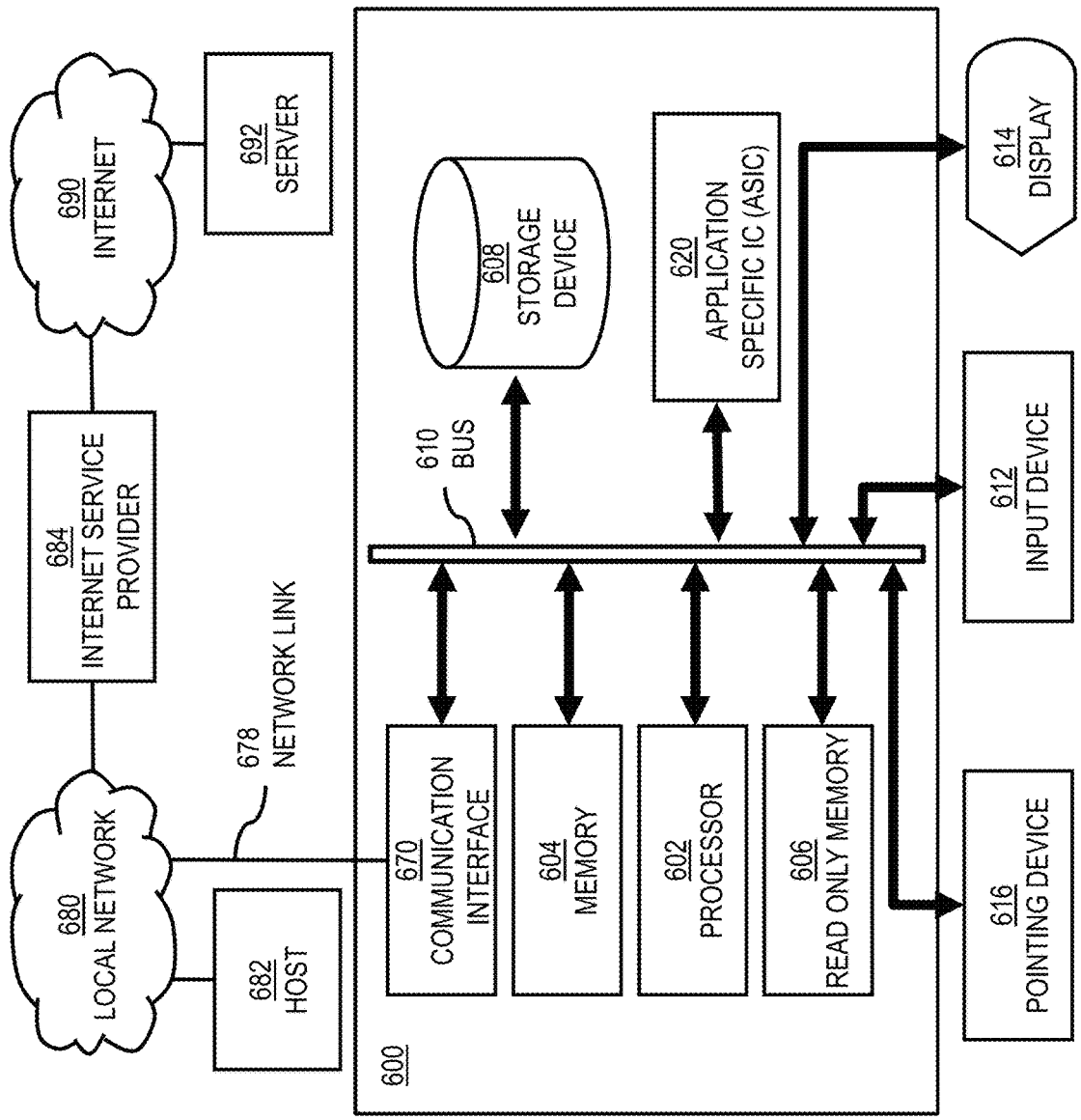
FIG. 6 is a diagram of hardware that can be used to implement an embodiment.

FIG. 6 illustrates a computer system 600 upon which an embodiment of the invention may be implemented. Computer system 600 is programmed (e.g., via computer program code or instructions) to map a payload survivability estimate and generate aerial routes as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to mapping a payload survivability estimate and generating aerial routes. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for mapping a payload survivability estimate and generating aerial routes. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for mapping a payload survivability estimate and generating aerial routes, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for calculating payload survivability estimates and generating aerial routes to the UE 101.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system can be deployed in various configurations within other computer systems, e.g., host 682 and server 692.

FIG. 7 illustrates a chip set 700 upon which an embodiment of the invention may be implemented. Chip set 700 is programmed to map a payload survivability estimate and generate aerial routes as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to map a payload survivability estimate and generate aerial routes. The memory 705 also stores the data associated with or generated by the execution of the inventive steps.

Figure 8:
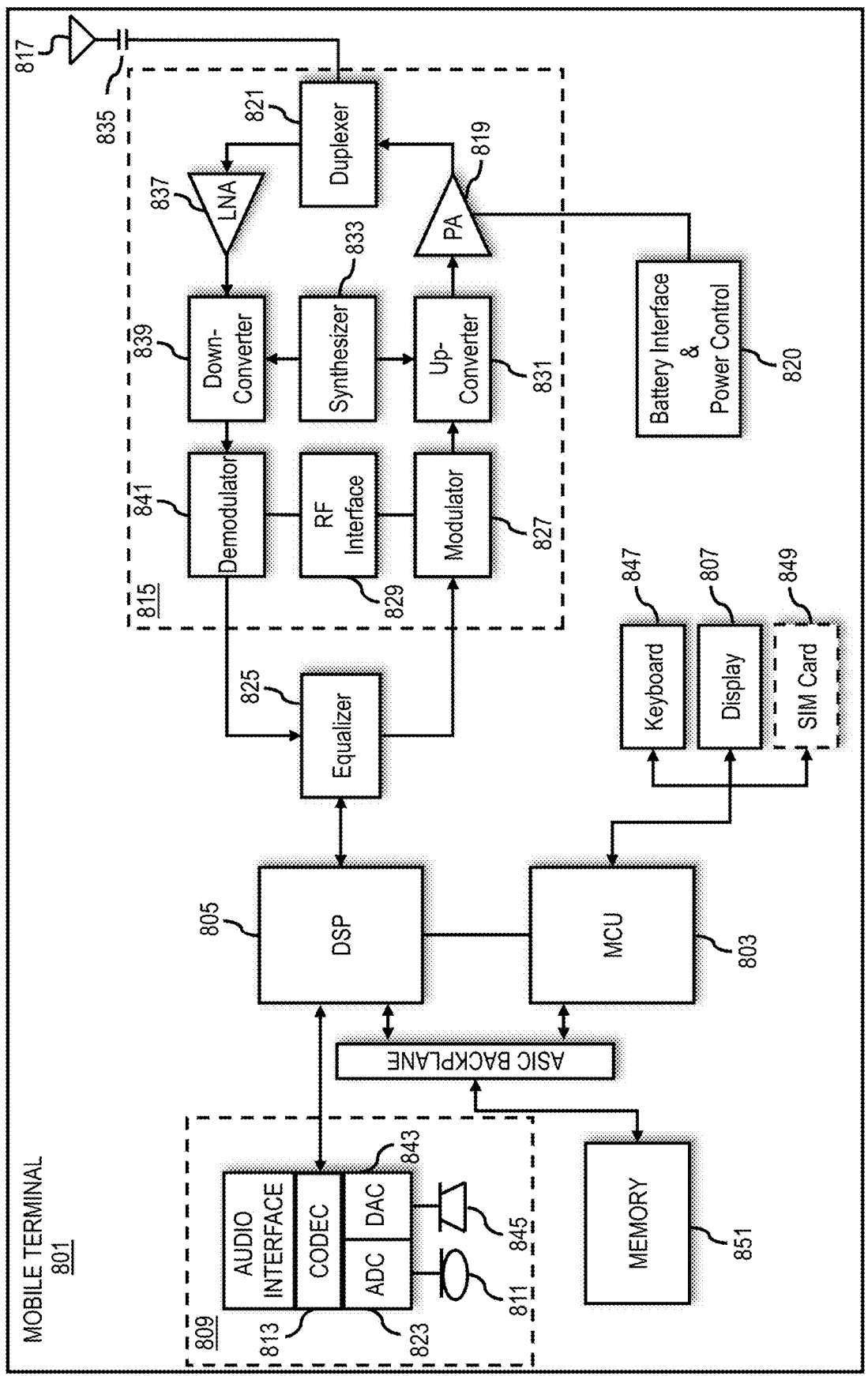
FIG. 8 is a diagram of a mobile terminal (e.g., handset or aerial vehicle or part thereof) that can be used to implement an embodiment.

FIG. 8 is a diagram of exemplary components of a mobile terminal 801 (e.g., handset or vehicle/aerial vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to map a payload survivability estimate and generate aerial routes. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 851 may be, but not limited to, a single memory, CD, DVD, ROM, RAM, EEPROM, optical storage, or any other non-volatile or non-transitory storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for generating an aerial navigation route based on a payload survivability estimate comprising:
   determining a payload of an aerial drone configured to operate over a geographic area;
   processing map data representing the geographic area to identify at least one map feature, at least one material corresponding with the at least one map feature, or a combination thereof;
   calculating a payload survivability estimate for the payload based on the at least one map feature, the at least one material, or a combination thereof, and a function of time that reflects one or more patterns of a payload survivability estimate for the geographic area, wherein the payload survivability estimate represents a probability that the payload will be functional following an impact of the payload; and
   generating the aerial navigation route based on the payload survivability estimate.

2. The method of claim 1, wherein the aerial navigation route is generated using a cost-function that maximizes the payload survivability estimate.

3. The method of claim 1, wherein the aerial navigation route is generated using a cost-function that minimizes the payload survivability estimate.

4. The method of claim 1, wherein the aerial navigation route, the payload survivability estimate, or a combination thereof is further based on sensor data collected from at least one sensor of the aerial drone.

5. The method of claim 4, further comprising:
   initiating a re-routing of the aerial drone based on an update of the sensor data, the map data, or a combination thereof.

6. The method of claim 1, wherein the payload survivability estimate is further based a payload type of the payload.

7. The method of claim 1, further comprising:
   modifying at least one flight operating parameter of the aerial drone to modify the estimated payload survivability.

8. The method of claim 7, wherein the at least one flight operating parameter includes a flight speed, a flight altitude, or a combination thereof.

9. The method of claim 1, wherein the navigation route is further based on maximizing a proximity of the aerial drone to at least one payload recovery entity.

10. The method of claim 1, wherein the navigation route is further based on a value associated with the payload.

11. The method of claim 1, further comprising:
providing data indicating the payload survivability estimate, one or more threats associated with the at least one map feature, or a combination thereof as an output.

12. The method of claim 1, further comprising:
providing data indicating that the payload survivability estimate, the at least one map feature, the at least one material, or a combination thereof is unknown based on an unavailability of the map data.

13. An apparatus for generating an aerial navigation route based on a payload survivability estimate comprising:
at least one processor; and
at least one memory including computer program code for at least one program,
the at least one memory and the computer program code configured to, with the at least one processor, cause the apparatus to:
receive map data representing a geographic area to identify at least one map feature, at least one material comprising the at least one map feature, or a combination thereof;
calculate a payload survivability estimate for a payload based on the at least one map feature, the at least one material, or a combination thereof, and a function of time that reflects one or more patterns of a payload survivability estimate for the geographic area, wherein the payload survivability estimate represents a probability that the payload will be functional following an impact of the payload, which is carried on the aerial navigation route; and
providing data for generating the aerial navigation route for an aerial drone based on the payload survivability estimate.

14. The apparatus of the claim 13, wherein the map data is stored in a payload survivability data layer of the geographic database.

15. The apparatus of claim 13, wherein the at least one map feature or at least one material is classified as affecting the payload based on determining that the at least one map feature or at least one material decreases the probability that the payload will be functional following an impact with the at least one map feature or at least one material.

16. The apparatus of claim 13, wherein the at least one map feature or at least one material is classified as affecting the payload based on determining that the at least one map feature or at least one material increases the probability that the payload will be functional following an impact with the at least one map feature or at least one material.

17. The apparatus of claim 13, wherein the payload survivability estimate for a payload is further based on sensor data collected from a sensor of the aerial drone.

18. A non-transitory computer-readable storage medium carrying one or more sequences of one or more instructions which, when executed by one or more processors, cause an apparatus for generating an aerial navigation route based on a payload survivability estimate to perform:
determining a payload survivability estimate for a payload based on at least one map feature, at least one material, or a combination thereof in a geographic area, and a function of time that reflects one or more patterns of a payload survivability estimate for the geographic area;
generating a map data layer based on the payload survivability estimate; and
providing the map data layer as an output,
wherein the output is published in a geographic database.

19. The non-transitory computer-readable storage medium of claim 18, wherein the apparatus is caused to further perform:
retrieving real-time data, historical data, or a combination thereof to identify at least one map feature, at least one material comprising the at least one map feature, or a combination thereof in a geographic,
wherein the real-time data, the historical data, or a combination thereof is further used to determine the payload survivability estimate.

20. The non-transitory computer-readable storage medium of claim 18, wherein the apparatus is caused to further perform:
creating a data model representing the payload survivability over a geographic area, wherein the map data layer further includes the data model; and
determining a route based on the data model representing the payload survivability over a geographic area in combination with terrain data.

* * * * *